United States Patent Office 3,401,259
Patented Sept. 10, 1968

3,401,259
**MOVABLE BLOCK VEHICLE SPEED
CONTROL SYSTEM**
George W. Baughman, Swissvale, Pa., assignor to Westinghouse Air Brake Company, Swissvale, Pa., a corporation of Pennsylvania
Filed Jan. 27, 1966, Ser. No. 523,293
14 Claims. (Cl. 246—187)

ABSTRACT OF THE DISCLOSURE

This invention relates to a movable block automatic speed control system drawn to the idea of controlling the speed of a following vehicle as a function of the actual speed of a lead vehicle and has in addition the provision of speed control of the following vehicle as a function of the distance a following vehicle is from a lead vehicle occupying a controlled section of the way.

---

Figure 1:
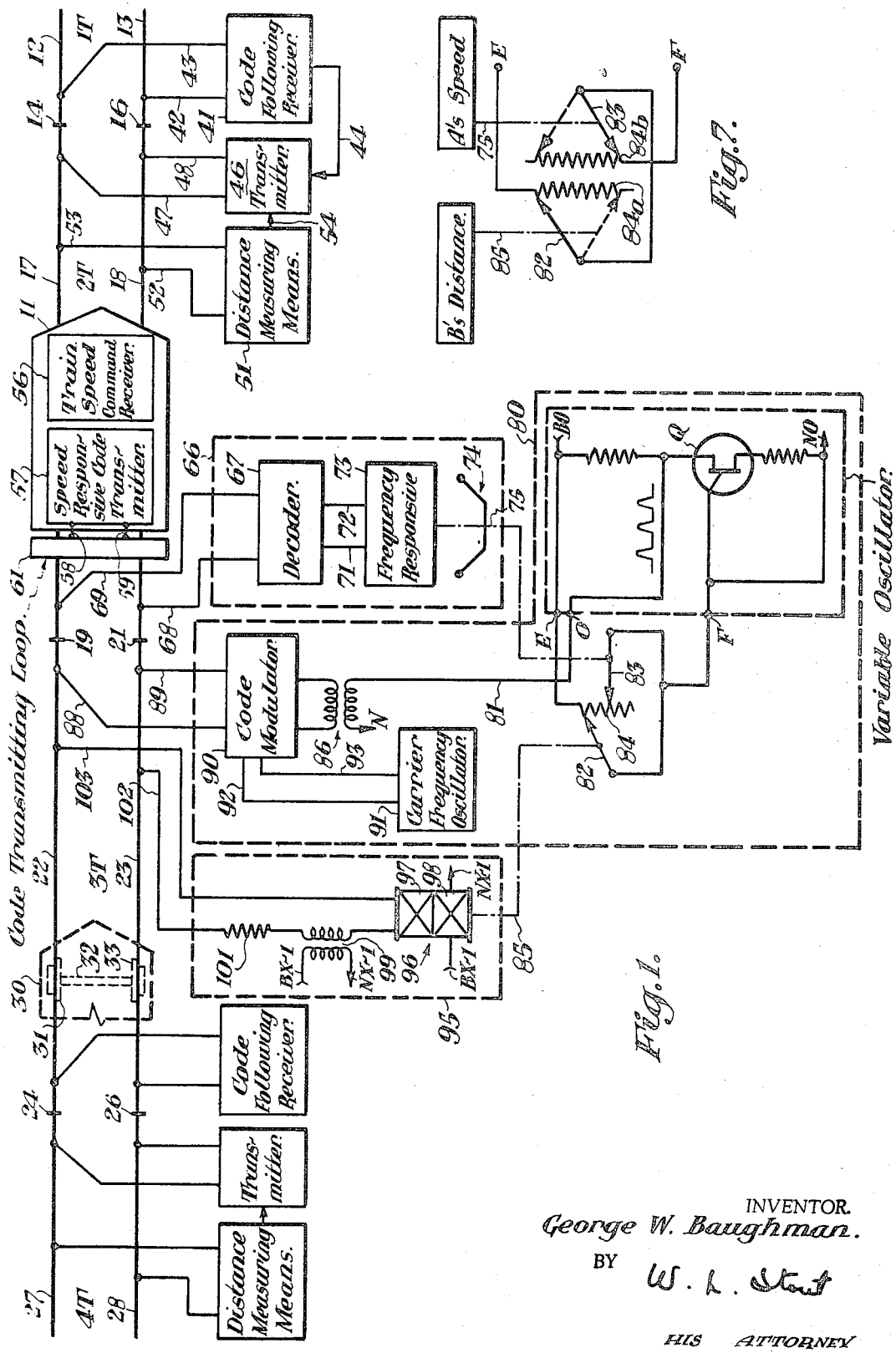

This invention relates to an improved movable block, automatic speed control system.

The invention to be described is an improvement over my copending application for Letters Patent of the United States, Ser. No. 520,125, filed Jan. 12, 1966, for a Movable Block Train Speed Control System, which is directed to the basic idea of controlling the speed of a following vehicle as a function of the actual speed of a lead vehicle. The invention of the instant application includes an additional factor in the speed control of the following vehicle. This factor takes into account the distance a following vehicle is from a lead vehicle occupying a controlled section of the way.

Today a large effort is being expended in the rapid transit field to reduce to a minimum the headway between vehicles. The problem of headway between vehicles is a dynamic problem which must take into account preset wayside conditions utilized in the control of vehicles operated along the way. One of the common approaches utilized is that of dividing the way upon which a vehicle travels into a series of control sections. Since these control sections are of a precise preselected length there must be a compromise between the length of the control section and the minimum headway between vehicles whenever a lead vehicle is stopped or moving very slowly in any one of the control sections. If the number of control sections is increased with the concomitant decrease in length of each control section, the headway can be reduced but the cost of wayside control equipment vastly increases.

The invention to be described allows for the very minimum of headway with the maximum length of control section by controlling the speed of a following vehicle as a function of both the actual speed of a lead vehicle and the distance the following vehicle is from the control section occupied by the lead vehicle. In addition, the system employing the instant invention also provides a unique precision vehicle stopping capability.

It is therefore an object of this invention to provide a vehicle speed control system in which the headway between vehicles may be reduced by the utilization of a speed control signal delivered to the following vehicle, which speed control signal reflects both the speed of the lead vehicle as well as the distance the following vehicle is from a control section of the way occupied by the lead vehicle.

Another object of this invention is the provision of a positive fail-safe speed control in a minimum headway multivehicle rapid transit system.

Yet another object of this invention is the provision of a precise vehicle stopping capability while simultaneously providing positive control of headway between vehicles.

Another object of this invention is the provision of a vehicle headway control system that may be readily installed in territories that incorporate track detection sections as when the system is utilized in a railway environment.

A final object of this invention is to provide a movable block speed control system having maximum efficiency and safety at minimum cost.

In the attainment of the foregoing objects the invention will be described in a railway installation for the purpose of setting forth a preferred embodiment of the invention. In the preferred embodiment, a movable block train speed control system is provided in railway territory characterized by the presence of a series of consecutive track sections separated by insulated joints. Each of the track sections has at the entrance end thereof a wayside receiver electrically connected to the rails and at the exit end of each track section there is electrically connected to the rails a train speed command transmitter and a train distance measuring device.

The trains that operate within the system have carried thereon a train speed command receiver and a train speed responsive transmitter. The train speed responsive transmitter has its output signal inductively impressed in the rails of the track section at the rear of the train to thereby effect a control of following trains. This just noted output signal from the train speed responsive transmitter is always indicative of a more restrictive train speed command than a train speed command received by the train speed command receiver from the wayside command speed transmitter when the train is alone in a track section.

The train distance measuring device connected to the exit end of a track section has an output which varies as a function of the decreasing distance from a train entering the track section to the exit end of the section where the distance measuring device is located.

Each of the wayside receivers at the entrance ends of the track sections has an output indicative of the output signal transmitted and received from the train speed responsive transmitter carried by the train. This, of course, occurs only when a train is occupying the track section being considered. In the absence of a train within any track section the wayside receivers have an output indicative of the train speed command transmitted by the wayside transmitters at the exit end of each track section.

Finally the wayside transmitters located at the exit end of each track section are jointly controlled by the output from the wayside receivers of the next succeeding track sections and the output of the distance measuring device also located at the exit end of each section.

It will therefore be seen that a train occupying any one track section has its speed controlled by the wayside transmitter first approached, which speed control is a function of the distance to the exit end of the section occupied and the speed of a train occupying the next succeeding track section. Of course if a preceding train is occupying the section entered, the speed of the following train is controlled solely by the signal output from the train speed responsive transmitter of the preceding train which is occupying the section entered.

Other objects and advantages of the present invention will become apparent from the ensuing description of illustrative embodiments thereof, in the course of which reference is had to the accompanying drawings in which:

FIG. 1 illustrates in block diagram form an embodiment of the movable block train speed control system of the invention.

FIGS. 2 to 6, inclusive, depict a variety of dynamic train traffic situations and the type of speed control provided by the invention.

FIG. 7 illustrates a variable oscillator resistance network.

A description of the above embodiment will follow and then the novel features of the invention will be presented in the appended claims.

Reference is now made to FIG. 1 which illustrates in diagram form an embodiment of the invention. In FIG. 1 there is depicted a plurality of consecutive track sections here set forth as track sections 1T, 2T, 3T and 4T. The track section 1T is comprised of a pair of rails 12 and 13, separated from track section 2T by insulated joints 14 and 16. The track section 2T is comprised of two rails 17 and 18 and this track section 2T is separated from track section 3T by insulated joints 19 and 21. In a like manner, track section 4T is separated from track section 3T by insulated joints 24 and 26. The rails of track section 4T are designated 27 and 28, while the rails of track section 3T are designated 22 and 23. In the embodiment being described the sections are referred to as track sections, but it should be understood hereafter that the term "control section" is equally applicable to describe the sections along the way defined by the individual track sections.

While this embodiment is shown in a railway environment, it should also be understood that should this system be applied to other modes of transportation the rails that comprise the various track sections might take the form of electrically conductive wires distributed along the way in a similar pattern to that set forth in FIG. 1. The connections to the wires, if these wires take the place of the rails, would be made inductively where there is an induction relationship set forth in the railway environment here described and by actual electrical connection with the wires should these wires be in actual physical contact with the various components to be described hereafter. With the above understood the rest of the description will proceed along the basis of a modern rapid transit system employing a number of trains traveling along a predetermined way, this way being defined by the presence of the consecutive track sections 1T, 2T, 3T and 4T.

Each of the track detection sections is characterized by having at its entrance end, that is, the end first approached by a train appearing from the left and passing to the right of this figure, a code following receiver. For example, track detection section 1T has a code following receiver 41 electrically connected by the leads 42 and 43 to the rails 12 and 13. The code following receiver 41 and its precise function will be better understood as a further description proceeds with reference to the other code following receivers also depicted in this figure. Suffice it to say at this point that the code following receiver has an output 44 which is delivered to a wayside transmitter 46 positioned at the exit end of the preceding track detection section. In accordance with the invention the track detection section 2T has at its exit end the wayside transmitter 46 electrically connected across the rails 17 and 18 by electrical connections 47 and 48. There is also depicted at the exit end of track detection section 2T a distance measuring means or device 51. This distance measuring means 51 is electrically connected to the rails 17 and 18 by electrical connections 52 and 53. This distance measuring means has been further described in my copending application for Letters Patent of the United States, Ser. No. 360,351, filed Apr. 16, 1964, now Patent No. 3,309,516, for Railway Signaling Systems, this distance measuring device being described in FIG. 7 of this copending application. The precise function of the distance measuring means 51 will be discussed in more detail hereafter.

There is depicted at the entrance end of the track detection section 2T a code following receiver 66 shown here in dotted outline. The code following receiver 66 is electrically connected across the rails 17 and 18 by electrical leads 68 and 69. The code following receiver 66 has as an integral portion thereof a decoder section 67 whose function is to decode the energy signal being delivered by the transmitter 46 at the exit end of the track detection section 2T when this track detection section 2T is un- occupied by a train. As has been noted, the wayside transmitter 46 at the exit end of track detection section 2T has one of its inputs from the code following receiver 41 and a second input 54 from the distance measuring means 51. The distance measuring means produces an output which is indicative of the distance between the connection of the distance measuring means at the exit end of the track detection section 2T and a train designated here as train 11 somewhere in the track detection section 2T. The precise cooperation of this train 11 in the track circuit of the track detection section 2T will be explained in more detail hereafter.

The code following receiver 66, as has been noted, includes a decoder 67 and a frequency responsive unit 73 electrically connected via leads 71 and 72. The frequency responsive unit 73 may take the form of an induction motor which is driven at a speed directly responsive to the change in frequency being delivered along the rails 17 and 18 and being received by the code following receiver 66. Since the frequency responsive unit 73 produces a rotary output which is a direct function of the frequency received, it will be understood that the centrifugal speed responsive mechanism 74, shown schematically here, will operate at a rotational speed indicative of the frequency being delivered from the rails through the decoder 67 and frequency responsive means 73 to the centrifugal speed responsive mechanism 74. This centrifugal speed responsive mechanism 74 has a linear physical output depicted by the dashed and dotted lines 75. This physical output brought about by movement of the speed responsive mechanism 74 produces an output which may be utilized to move a wiper contact 83 which will be described more fully hereafter.

Returning now to the train 11 depicted as occupying the track detection section 2T, the train 11 has mounted thereon a train speed command receiver 56. This train speed command receiver is of the same type depicted and described in my copending application for Letters Patent of the United States, Ser. No. 520,125, hereinbefore referred to, and this train speed command receiver 56 receives energy from the rails 17 and 18 by induction coils mounted on the front of the train over the rails 17 and 18. These coils are not shown in this figure. The train speed command receiver, upon receipt of a signal from the wayside transmitter 46 which is connected at the exit end of the track detection section 2T, will deliver to the motive power units of the train a command signal which will determine the precise speed of the train. In the embodiment in which this system is to be described, the higher the frequency received or delivered by the wayside transmitter 46 the faster the train 11 will be commanded to operate. Positioned also on the train is a speed responsive code transmitter 57. This speed responsive code transmitter 57 has been explained in detail in my copending application Ser. No. 520,125, above referred to, and this speed responsive code transmitter is so constructed that its output will bear a direction relationship to the actual speed of the train 11. Notice that this speed responsive code transmitter 57 will produce an output, by design, which will always command a speed less than the actual speed at which the train 11 is traveling. In the copending application Ser. No. 520,125, the speed of the train is taken as a function of the rotary seed of one of the axles of the train and this is converted into an appropriate coded frequency signal which is then delivered to the code transmitting loop 61 via the electrical leads 58 and 59. This code transmitting loop 61 is positioned at the rear of the train and inductively impresses in the rails 17 and 18 a signal which is a function of the actual speed at which the train is traveling, and by design this signal induced in the rails 17 and 18 will always be indicative of a train command for a more restrictive speed than the train command signal being received by the train speed command receiver 56 from wayside transmitter 46 at the exit end of the track detection section 2T. Note that the train speed command receiver includes means (not shown) to receive a variable frequency signal or a coded frequency signal. The means to receive the coded frequency signal is operative to control the speed of the train in those instances when the train under discussion is following a lead train and is occupying the same track detection section. This aspect of the invention will become more apparent as the description of the invention proceeds.

It will be appreciated therefore that immediately behind the train 11 there has been induced in the rails 17 and 18 a command signal of such a nature that should a following train enter immediately behind the train 11, the command receiver on the following train would receive a signal indicative of a lower speed than that speed at which the train 11 was traveling.

As has been noted earlier, at the entrance end of the track detection section 2T there is the code following receiver 66 shown in dotted outlines and this code following receiver 66 has a physical output designated by reference numeral 75. This output 75 from the code following receiver 66 is delivered to the wayside transmitter 80, here also shown dotted. It will be understood that the wayside transmitter 80 and all of the related equipment it contains has been enclosed by the dotted lines designated by the reference numeral 80, and this wayside transmitter 80 includes a number of distinctive components. At the heart of the wayside transmitter is a variable oscillator and this variable oscillator is controlled in part by the output 75 from the code following receiver 66. The precise manner of the control will be explained more fully hereafter.

The wayside transmitter 80 is electrically connected to the rails 22 and 23 of the track detection section 3T by the electrical leads 88 and 89. Positioned also at the exit end of the track detection section 3T is a distance measuring device 95 shown in dotted outline. This distance measuring device is explained in detail in my copending application Ser. No. 360,351, above referred to. Accordingly, since a detailed description of the function of this distance measuring device is set forth in this copending application, only a brief description of the operation of this aspect of the invention will be made at this time.

The distance measuring device includes an alternating current power source being delivered to the distance measuring device and related circuitry. This alternating current power source is delivered via the terminals BX–1 and NX–1, the alternating current energy being transferred via a transformer 99 into a circuit which will now be described. This circuit which has an alternating current signal delivered thereto includes the secondary coil of the transformer 99, a resistance 101, the electrical lead 102, the rail 23, and wheel 33 on rail 23, which wheel is shown dotted in the train 30 depicted as occupying a portion of track detection section 3T. The circuit goes on to include the axle 32 shown dotted, as well as the wheel 31 which travels upon the rail 22. The circuit is completed via this rail 22 and the electrical lead 103 which is in turn connected to the first winding of the distance measuring device. It will be seen that this circuit, which includes the alternating current energy source BX–1, NX–1, includes a variable component in the form of the train 30 and its axle and wheels 32, 31, 33, which wheels 31 and 33 along with the axle 32 continuously shunt the circuit and in so shunting the circuit produce a variable impedance. This impedance varies as the train moves down the rail, thereby decreasing the length of the circuit and accordingly altering the phase of the alternating current energy being passed by the circuit. This change in phase of the signal will produce in the first winding 97 of the two-winding vane type relay 96 an induced field which will be compared with the field present in the second winding 98 of the vane type relay 96. These vane type relays are of a conventional nature. The second winding 98 has supplied to it the same alternating current power source BX–1, NX–1 and therefore the resultant output from the vane type relay 96 will be a measure of the difference in the phase of the current present in the circuit which includes the moving train 30 and the phase of the current present in the second winding 98. This will produce a physical output in the movement of the vane which is a portion of this relay and this movement is designated by the output 85 of the vane type relay 96. This physical output takes the form of a linear movement of the output 85 and follows the pattern which is described as follows.

As the train enters the track detection section 2T and therefore the circuit that includes the first winding of the vane type relay 96, the impedance in this circuit changes as the wheels continuously shunt the rails 22 and 23. This shunting of the rails produces a continuously changing phase relationship of the current in the circuit which includes the first winding 97 of relay 96 and this change in phase results in an output movement of the output 85 which in essence is a smooth, continuous upward movement of the output 85. This continuously increasing upward movement of the output 85 is transmitted through a wiper arm 82, which wiper arm 82 is moving along a variable resistance 84. As the train 30 moves from the entrance end of the track detection section 3T toward the exit end, the output 85 will move continuously upward and in so doing will move the wiper arm 82 in an upward movement, thereby decreasing the amount of resistance in the circuit that includes the wiper arm 82. It will be seen that this is a fail-safe arrangement in that should any short circuit or power failure occur, the wiper arm 82 would drop away and there would be a maximum resistance placed in the circuit including the wiper arm 82.

The precise function of the variable resistance brought about by movement of the wiper arm 82 over the resistance element 84 will be explained hereafter. It should also be recognized at this time that the output 75 from the code following receiver 66 also moves a wiper arm 83 over the resistance 84, and in so doing also functions to vary the resistance in the circuit that includes the wiper arm 83. The wiper arm 83, as well as 82, are both connected to the point F of the variable oscillator shown in dotted outline. The resistance 84 is shown connected at the point E to the variable oscillator shown here in dotted outline. The variable oscillator illustrated here is a variable frequency oscillator of the relaxation type using a unijunction transistor Q, and having battery terminals B0 and N0. A specific example and complete description of the oscillator circuit here used may be found in FIG. 13.9, page 194, of the General Electric Transistor Manual, sixth edition.

The oscillator circuit arrangement illustrated except for the biasing resistor 84 is for convenience enclosed, as has been noted, in the dashed block designated as a "variable oscillator." It is to be understood, of course, that other equivalent circuits providing an adjustable pulse output within the desired frequency range may be substituted for the variable oscillator and still fall within the scope of the invention now being described. It is sufficient for purposes of explaining the operation of the invention to understand, that by varying the total resistance connected between the terminals E and F of the conventional oscillator, variations in the pulse output frequency may be obtained. A smooth variation in the amount of resistance causes a continuous frequency shift in the output from the terminal 0 of the "variable oscillator." The output from the variable oscillator is delivered via the electrical lead 81 from terminal 0 to the transformer 86 and this variable frequency output is in turn used to control a code modulator 90 which is being supplied by carrier frequency oscillator source 91 via electrical leads 92 and 93. The signal that has been modulated as a result of the output from the variable oscillator via the electrical lead 81 is in turn delivered to the exit end of the track detection section 3T via the electrical leads 88 and 89.

By using a variable resistance 84 provided with slide contacts 82 and 83, which slide contacts 82 and 83 are under the direct control of either the distance measuring device's output 85 or the code following receiver output 75, a desired control may be obtained over trains entering section 3T. This control will be better understood from a study made of FIGS. 2 through 6 to be presented hereafter.

In the specific type of oscillator circuit shown here in FIG. 1, a reduction in the amount of biasing resistance provided by the resistance 84 and the related wiper contacts 82 and 83 results in an increase in the frequency of the pulse oscillator in the output circuit from the terminal 0 via the electrical lead 81. Accordingly, it will be understood that as the biasing resistance decreases, that is, the biasing resistance provided by the resistor 84 between the terminals E and F of the variable oscillator decreases, there is an increase in the variable frequency output from the oscillator and this increase in the variable frequency output via the lead 81 results in an increased frequency signal being delivered to the rails 22 and 23. This increased frequency is indicative of an increased speed command, the system being designed to respond to the following basic conditions. As the frequency of the signals delivered to the rails increases, the maximum permissible speed of the train receiving these signals also increases. A decrease in the frequency of the signals delivered to the rails produces a decrease in the maximum permissible speed allowed by the train. As can be seen from the arrangement of the wiper arms 82 and 83, as the train 30 approaches, the impedance of the circuit which includes the wheels of the train changes. This change is reflected by the output 85 of the distance measuring means 95 and will result in a continual downward movement of the arm 82, thereby increasing the resistance in the circuit that includes the wiper arm 82. This increase in resistance, if it were the sole controlling factor in the frequency being delivered to the rails 22 and 23, would bring about a decrease in the frequency of the signal delivered via the lead 81 from the variable oscillator, and this increase in resistance would produce a decrease in the frequency which would approximate zero frequency when the wiper arm 82 had reached the bottom of its travel as the train 30 approached the exit end of the track detection section 3T. But as can be seen the wiper arm 82 does not provide the sole control of the variable frequency oscillator. The biasing resistance presented to the variable oscillator is also controlled by the movement of the wiper arm 83. This wiper arm 83 will move in an upward direction as the frequency of the signal being received by the wayside code following receiver 66 increases. This increased signal produces an upward movement of the wiper arm 83 and a decrease in the biasing resistance of the variable oscillator. This decrease in resistance produces an increase in the frequency of the signal delivered via the electrical lead 81 to the code modulator 90.

It can therefore be seen that broadly speaking the faster the actual speed of the train 11 the higher will be the frequency delivered via the code transmitting loop 61 to the rails 17 and 18, and the higher the frequency delivered to the rails 17 and 18 and received by the code following receiver 66, the more rapid will be the rotary movement of the centrifugal speed responsive mechanism 74 which will produce an upward movement of the output linkage 75 of the wayside code following receiver 66, which upward movement of the output 75 will result in a decreased biasing resistance being presented to the variable oscillator circuitry. This will be indicative of a need for increased frequency to be delivered by the variable frequency oscillator.

On the other hand, as a train approaches the exit end of the preceding track detection section 3T, the change in impedance of the circuit which includes this following train 30 will produce a downward movement of the wiper arm 82 which will cause an increase in the biasing resistance to the oscillator circuit. This aspect of the control will, under certain conditions to be described hereafter, cause the variable oscillator to produce a constantly reduced frequency output over the electrical lead 81, to a point where under some situations the frequency of the output from the variable frequency oscillator will in fact be zero.

FIGS. 2 through 6 are schematic presentations of different dynamic situations in which the invention being described provides speed control for trains that are following. It should be understood, of course, that these figures do not include the illustration of the code following receivers at the entrance end of each track detection section, or the transmitters located at the exit end of each track detection section. Each of these figures contains a functional block which describes the type of output being delivered to the variable resistance arrangement which provides the biasing for the variable oscillator depicted in FIG. 1.

Figure 2:
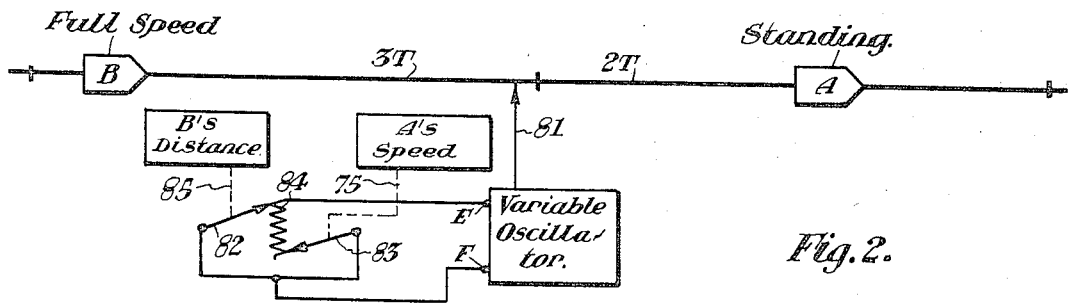

In this instance, for example, in FIG. 2, as in the other figures, there is one block designated "B's Distance." This block is intended to convey the concept that the output 85 is a direct function of the distance train B is from the exit end of track detection section 3T. Therefore, as the train B approaches the exit end of the track detection section 3T, the output 85 will continuously move the wiper arm 82 in a downward direction to increase to a maximum the resistance between the points E and F of the variable oscillator. On the other hand, the block designated "A's Speed" has an output 75 which corresponds to the output from the wayside code following receiver 66 of FIG. 1. This output 75 moves the wiper arm 83 as a function of the coded frequency of the signal being delivered by the speed responsive code transmitter of the lead train 11 depicted in FIG. 1. In other words, the train designated A in FIGS. 2 through 6 is comparable to the train 11 of FIG. 1, while the train B is comparable to the train 30 of FIG. 1. The output from the block designated "A's Speed" is a function of the speed responsive code transmitter output which would emanate from the train A.

Therefore, with specific reference to FIG. 2 where train A has been designated as standing, its speed responsive code transmitter, not shown, would have no output since the train was at a standstill, and since no output was being delivered to the rails of the track detection section 2T immediately behind the train, there would be a zero indication being delivered from the block designated "A's Speed." In other words, the output 75 would not be moving at all and the wiper contact arm 83 would be in its downward position indicative of the need for maximum resistance. It will be seen though that with train B positioned just entering the track detection section 3T, B's distance from the exit end of track detection section 3T is at a maximum, and therefore the train B need not reduce its speed since the entire track detection section 3T ahead of it is vacant. Train A might be just beyond the joints so 3T has to provide braking distance for train B. Therefore, the output 85 is in its highest position and the wiper arm 82 is presenting the minimum resistance to the circuit which includes the wiper arm 82. The resistance between terminals E and F is determined by the positions of each of the contact arms 82 and 83, jointly.

It will be appreciated that with this physical arrangement of the contacts 82 and 83, shown in FIG. 2, the biasing resistance of the variable oscillator will be determined by the position of the wiper contact 82, and as has been noted with a minimum resistance there will be delivered by the variable frequency oscillator over the output 81 a maximum frequency signal and this maximum frequency signal will be delivered to the rails of the track detection section 3T to give a full speed ahead command to the train B.

Figure 3:
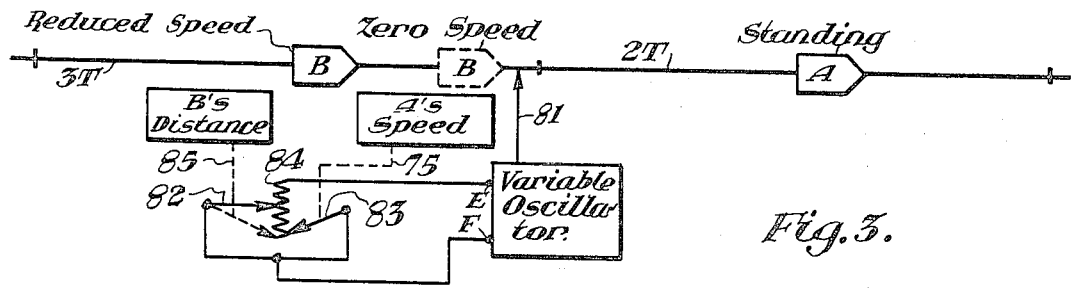

Reference is now made to FIG. 3. In this particular figure the train A is again considered to be standing and, of course, there is no output from its speed responsive code transmitter, and therefore immediately behind the train A in the track detection section 2T there is no signal. Since there is no signal, A's speed, as indicated by the movement of the output 75 of the block designated "A's Speed," will be at its most downward position, and the wiper arm 83 will be at rest at the bottom of its travel, along the surface of the resistor 84. In this FIG. 3 the train B shown in solid lines will have approached from the entrance end of track detection section 3T to approximately the middle of the track detection section. This movement from the entrance to the middle will produce a downward movement of the output 85 from the block designated "B's Distance," and as was the case in FIG. 2 the resistance in the circuit between the terminals E and F of the variable frequency oscillator is determined by the positions of the wiper arms 82 and 83. This position of the wiper arm 82 is shown by a solid wiper arm positioned at approximately a point midway along the resistance 84. This resistance provided by the positions of the wiper arms 82 and 83 produces a variable frequency output along the output 81 to the track detection 3T which would be delivered to the train B shown in solid lines, and this frequency signal would be indicative of the maximum permissible speed consistent with bringing the train to a stop at the exit end of track detection section 3T.

This FIG. 3 is also intended to convey the type of speed control delivered to the train B when the train B has moved to the very exit end of track detection section 3T. In this instance the train B is shown in a dotted manner and the effect of the train's movement from the middle of the track detection section to the exit of the track detection section 3T is illustrated by the new position of the contact arm 82 now shown in its dotted position to correspond to the dotted outlined position of the train B at the exit end of the track detection section 3T. In this situation the wiper arms 82 and 83 are at the very bottom of their downward travel and therefore provide the maximum resistance between the terminals E and F of the variable frequency oscillator. This maximum biasing resistance causes a zero frequency condition to arise and the absence of a signal from the variable frequency oscillator on output 81 results in the absence of a signal being delivered to the train B shown in its dotted position. Accordingly, this train B shown dotted then will brake to a halt before it enters the track detection section 2T where the train A is standing.

Figure 4:
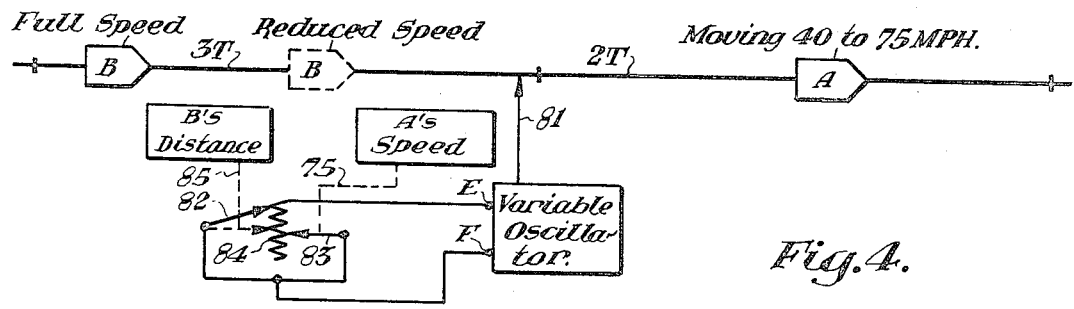

FIG. 4 is intended to convey the next dynamic type of train speed control that may arise, when in this instance the train A, that is, the lead train, is moving at a speed between 40 and 75 miles per hour. It should be understood that the speed range of 40 to 75 miles per hour is meant only to be exemplary of the typical speed range and is being utilized for purposes of illustrating the invention only and not intended to limit the scope of the control provided for the following train. In this FIG. 4 with the train A moving in this speed range, there would be delivered to the rails of the track detection section 2T immediately behind the train A a signal indicative of this actual speed range, that is 40 to 75 miles per hour, and this signal delivered to the rails of the track detection section 2T would be reflected in the linear movement of the output 75 and the block designated "A's Speed." For purposes of this explanation the wiper arm 83 is shown midway along the resistor 84. The speed of train A is approximately the middle range of the speed at which the train A can operate.

To the left in this FIG. 4, train B is shown in solid lines entering at the entrance end of the track detection section 3T. With the train B in this position, the output 85 from the block which designates B's distance from the exit end of the track detection section 3T will cause the wiper arm 82 to be in its upward position, and the circuit which includes the biasing resistance between the terminals E and F of the variable frequency oscillator will then include the wiper arm 82 and this minimum resistance will exert a major influence in the control of the frequency output of the variable frequency oscillator. Since this biasing resistance is low, as determined by the position of the wiper arm 82 shown solid, a maximum frequency output will be delivered by the variable frequency oscillator via the electrical lead 81 and this maximum frequency signal will be delivered to the rails of the track detection section 3T and result in train B, shown solid, operating at full speed ahead.

The next dynamic condition depicted by this FIG. 4 takes place where the train B is approximately half-way through the track detection section 3T. In this instance the train B is shown to be in the dotted position indicated and therefore the output 85 from the block which indicates B's distance from the exit end of track detection section 3T will cause the wiper arm 82 to assume the position, shown dotted, for this wiper arm 82, which is approximately half-way down the resistance 84. Under this situation the biasing resistance applied to the variable frequency oscillator by terminals E and F will be such as to produce a frequency that will authorize the maximum safe speed to train B consistent with the distance to the exit of track detection section 3T and the speed of train A.

Figure 5:
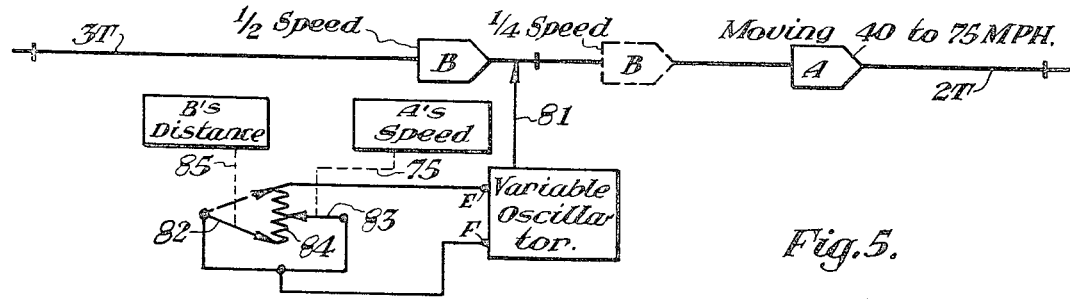

Reference is now made to FIG. 5. Again, in this figure as in FIG. 4 the train A operating in track detection section 2T is shown moving at a speed range between 40 and 75 miles per hour. As was noted with reference to FIG. 4, there is a command signal being delivered by the train A to the rails immediately behind the train A and this signal is indicative of the actual speed of the train A. This signal will be delivered to the receiver at the entrance end of the track detection section 2T and will be reflected in the output 75 from the block designating A's speed. This output 75 will cause the wiper arm 83 to assume a midway position in the same manner as was described with reference to FIG. 4.

In this particular figure the train B shown in solid lines has reached the exit end of the track detection section 3T. The fact that train B shown in solid lines has reached the exit end of track detection section 3T will cause the output from the block which indicates B's distance from the exit end of the track detection section 3T to assume its most downward position shown by the solid contact 82. In other words, when the train B has reached the end of the track detection section 3T, this will have caused the output 85 of the distance measuring block designated "B's Distance" to present to the variable frequency oscillator the maximum biasing resistance which would be indicative of a minimum or zero speed. But, as has been noted, since the train A is moving at a rate of 40 to 75 miles per hour, the wiper arm 83 controlled by the output 75 is in a mid position and therefore the biasing resistance presented to the variable frequency oscillator between the terminals E and F is that circuit which includes the wiper arm 83 and that portion of the resistance immediately between the wiper arm 83 and the terminal E. Therefore, the variable frequency oscillator will have a bias that is related to the speed of train A. The variable frequency oscillator will produce a signal over the output 81 which will command the train B shown solid to operate at a speed dependent on the speed of train A. This, of course, is reasonable since the train A is moving at a rate of speed between 40 and 75 miles per hour, and therefore the train B may also continue its movement.

FIG. 5 shows the train B in dotted lines having entered the track detection section 2T immediately behind the train A. When a train has approached the lead train this closely, the effect of the distance measuring device and the variable frequency oscillator no longer controls the speed of this train. In other words, once the train B, shown dotted, has entered the track detection section occupied, this train B receives its train speed command directly from the rails and the signal that it receives is that signal being delivered by the train A which has been induced in the rails behind the train A and which, as has been noted, is indicative of a train speed command less than the actual speed at which the train A is traveling. In this instance, for purposes of explanation, the train speed command signal delivered by the train A to the rails immediately behind the train A is indicative of a speed, for example, in the range of one-quarter to some speed less than one-half the maximum speed. Therefore, the train B once it has entered track detection section 2T operates in the one-quarter to one-half speed range. It will be seen that this affords a minimum headway between the trains A and B but always presents a train speed command to the following train which is always less than the speed which could bring the second or following train into a rear end collision with the lead train.

Figure 6:
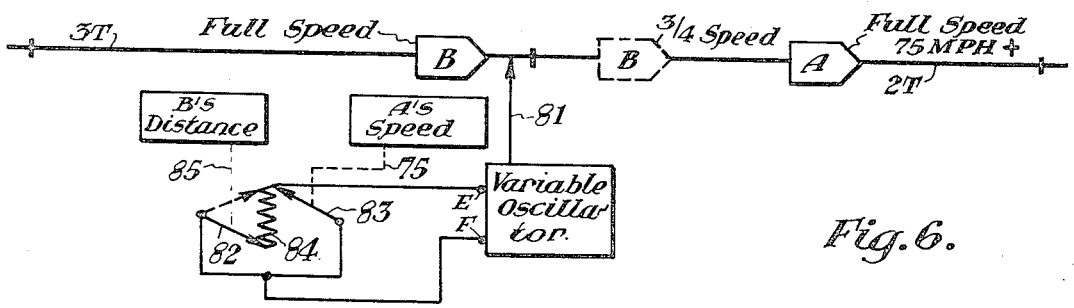

The final dynamic condition depicted is set forth in FIG. 6 where the train A is shown operating at full speed conditions, namely 75 miles per hour plus, in the track detection section 2T. Where this has occurred the command speed signal being delivered to the rails immediately behind the train A will be indicative of a command speed which is three-quarters the speed of the train A. This command speed signal, which will be reflected in the output 75 from the block designated A's speed, will cause the contact arm 83 to assume its most upward position and in so assuming this position present a minimum biasing resistance to the variable frequency oscillator across the terminals E and F of the variable oscillator. In this instance, with the train B shown in solid lines at the exit end of the track detection section, the output 85 from the block which designates B's distance will have caused the wiper arm 82 shown solid to assume its most downward position. But since the wiper arm 83 is controlling the amount of biasing resistance of the variable frequency oscillator, the resistance presented by the circuit which includes the wiper arm 83 is that which controls the variable frequency output, and since this is a minimum resistance the variable frequency oscillator will produce a command speed signal over the output 81 to the track detection section 3T which will permit the train B to operate at full speed ahead.

When the train B now shown dotted has left track detection section 3T and entered track detection section 2T, the train B will no longer have an effect on the wiper arm 82 and therefore the wiper arm 82 will assume the dotted position shown in this figure and therefore present a minimum resistance to the biasing circuit between the terminals E and F of the variable frequency oscillator, which will therefore permit a maximum speed signal to be delivered by the variable frequency oscillator for any subsequent train entering the track detection section 3T. Once the train has left the track detection section 3T, this train B now shown dotted comes under the influence of the train speed command signal induced in the rails behind the train A and this train speed command signal, as has been noted earlier, is selected to be always less than the actual speed at which the train A is operating. In this instance, a three-quarter speed has been designed into this embodiment and the train B comes under the influence of the signal in the rails which has been induced therein by the train A's speed responsive code transmitter. Therefore, the train B will proceed in track detection section 2T at a three-quarter speed and maintain this headway between it and the train A.

Reference is now made to FIG. 7 which depicts a modification of the frequency control for the variable oscillator described with reference to FIG. 1 through FIG. 6. The arrangement depicted in FIG. 7 sets forth another arrangement of the resistance element which is part of the variable oscillator. The resistance 84 referred to in FIG. 1 through FIG 6 has substituted therefore a pair of resistors 84a and 84b. The functions of these two resistors are to provide a purely additive nature to the resistance network between the points E and F. In other words, the resistances determined by the train speed input 75 and the distance input 85 are summed by the resistance network depicted. FIG. 7 depicts, of course, only that circuitry between the points E and F of the variable oscillator. Applicable portions of resistances 84a and 84b will be added together under all dynamic modes of train operation.

It should be noted that the code transmitting loop 61 and the related speed responsive code transmitter 57 referred to earlier produced a series of stepped coded outputs indicative of the actual speed range at which the train 11 was operating. In the arrangement described earlier, the fact that the signals being delivered by the code transmitting loop 61 were indicative of ranges of speed of train 11 made permissible the use of a single resistance element 84.

There are situations that may arise where the train in the system will have speed responsive transmitters which vary over the entire range of actual speed of the train 11. In those situations where the train 11 has a speed responsive transmitter which sends out a continuously variable signal via its loop 61 there must be provided the additional capacity within the variable frequency oscillator to reflect this continuously varying signal. Such is not the case with the resistor arrangement depicted in FIG. 1 through FIG. 6 because in these figures the wiper arm 82 or 83, as the case may be, will control the variable frequency oscillator dependent upon the relative position of either one of the wiper arms 82 or 83.

As was noted in FIG. 2, when the wiper arm 82 is in the position depicted, this wiper arm controls exclusively the frequency output from the variable frequency oscillator, and the wiper arm 83 has no effect on the output from the variable frequency oscillator.

Reference is now made to FIG. 7 where the wiper arms 82 and 83 bear the same reference numerals used in the earlier noted figures and as previously noted the resistance element 84 has been divided into two separate resistance elements 84a and 84b. It will be appreciated that as the output from the distance measuring device, that is, output 85, moves the wiper arm 82 up and down as a function of the distance the following train is from the point at which the distance measuring device is connected to the rails, this movement of output 85 and related wiper arm 82 will add to or take away from the total resistance in the circuit between the points E and F, thereby controlling the output of the variable frequency oscillator. In a similar manner, the output 75 which is indicative of the output signal from the speed responsive transmitter carried by the lead train will, in the embodiment now being described, cause a continuously variable movement of this output 75 and its related wiper arm 83. This continuously variable movement which is directly proportional to the actual speed of the lead train will position the wiper arm 83 to add to the circuit or remove from the circuit between the points E and F the resistance essential to reflect the actual speed of the lead train, and thereby effect a control of the following train as a function of the portion of the resistances 84a and 84b being added to the circuit between the points E and F.

It will therefore be appreciated that this system provides the unique capabilities of dynamically controlling the speeds of trains that must operate in a system under close headways, and in providing this speed control for the following trains there is a fail-safe measure provided. It is this unique combination of speed control for following trains as a function of the distance the following train is from the exit end of a track detection section and the actual speed of a lead train that provides the basis for the invention to be set forth in the claims appended hereto.

While the present invention has been illustrated and disclosed in connection with the details of the illustrative embodiments thereof, it should be understood that those are not intended to be limitative of the invention as set forth in the accompanying claims.

Having thus described my invention, what I claim is:

1. A vehicle speed control system for use along a way characterized by the presence of a series of consecutive control sections,
   (a) each of said control sections having located at its entrance end a wayside receiver and at the exit end of each control section a wayside vehicle command transmitter and a vehicle distance measuring means,
   (b) each of the vehicles operating in the system has a vehicle speed command receiver and a vehicle carried speed responsive transmitter which has an output which is effective in the control of following vehicles and which output signal is always indicative of a more restrictive vehicle speed command than the vehicle speed command received by said vehicle's speed command receiver from said wayside vehicle command transmitter,
   (c) said vehicle distance measuring means having an output which is a function of the distance between a train entering a section and said exit end of said section entered,
   (d) said wayside receivers at said entrance ends of said sections having an output indicative of said output signal received from said vehicle speed responsive transmitter when a vehicle is occupying a control section, and
       said wayside receivers having another output indicative of the vehicle speed command delivered from said wayside transmitter at said exit end of said section when said section is unoccupied,
   (e) said wayside transmitter jointly controlled by said output from said wayside receiver and said output from said distance measuring means, whereby a vehicle occupying any one section has its speed controlled by the wayside transmitter first approached, which speed control is a function of the distance to the exit end of said control section occupied, and the speed of a vehicle occupying the next succeeding section, unless a preceding vehicle is occupying the control section entered whereupon the speed of the following vehicle is controlled solely by the signal output from said vehicle speed responsive transmitter of said vehicle occupying said control section entered.

2. The vehicle speed control system of claim 1 wherein said series of consecutive control sections include pairs of rails each of said control sections defined by the presence of insulated joints between the consecutive pairs of rails which form each section.

3. The vehicle speed control system of claim 2 wherein said rails of said sections have electrically connected thereto at the exit end of each section said vehicle command transmitter and said distance measuring means.

4. The vehicle speed control system of claim 3 wherein said vehicle-carried speed responsive transmitter impresses in said sails at the rear of said vehicle said signal indicative of a more restrictive speed than the speed command received by said vehicle's speed command receiver.

5. The vehicle speed control system of claim 4 wherein said vehicle command receiver of said vehicle inductively detects from the rails the presence of vehicle speed command signals from said wayside vehicle command transmitter when said control section entered is unoccupied by another preceding vehicle.

6. The vehicle speed control system of claim 1 wherein said wayside command speed transmitter includes a variable frequency oscillator having an output signal which is mutually determined by said distance measuring means output and said wayside receiver output.

7. A train speed control system for use in territory characterized by the presence of a series of consecutive track sections,
   (a) each of said track sections having located at its entrance end of said section a wayside receiver and at the exit end of said section a wayside train speed command transmitter and a train distance measuring means,
   (b) each of the trains operating in the system having a train speed command receiver and a train speed responsive transmitter which has an output which is effective in the control of following trains and which output signal is always indicative of a more restrictive train speed command than the train speed command received by said train speed command receiver from said wayside transmitter,
   (c) said train distance measuring means having an output which is a function of the distance between a train entering a section and said exit end of said section entered,
   (d) said wayside receivers at said entrance ends of said sections having an output indicative of said output signal received from said train speed responsive transmitter when a train is occupying a track section and said wayside receivers having another output indicative of the train speed command delivered from said wayside transmitter at said exit end of said section when said section is unoccupied,
   (e) said wayside transmitter jointly controlled by said output from said wayside receiver and said output from said distance measuring means, whereby a train occupying any one section has its speed controlled by the wayside transmitter first approached, which speed control is a function of the distance to the exit end of said section occupied and the speed of a train occupying the next succeeding section, unless a preceding train is occupying the section entered whereupon the speed of the following train is controlled solely by the signal output from said train speed responsive transmitter of said train occupying said section entered.

8. The train speed control system of claim 7 wherein the rails of each said track section are separated by insulated joints.

9. The train speed control system of claim 8 wherein said rails of said sections have electrically connected thereto at the exit end of each section said train speed command transmitter and said distance measuring means.

10. The vehicle speed control system of claim 9 wherein said train-carried speed responsive transmitter inductively impresses in said rails at the rear of said train said signal indicative of a more restrictive speed than the speed command received by said train's speed command receiver.

11. The train speed control system of claim 10 wherein said train speed command receiver of said train inductively detects from the rails the presence of train speed command signals from said wayside train's speed command transmitter when said track section entered is unoccupied by another preceding train.

12. The train speed control system of claim 7 wherein said wayside command speed transmitter includes a variable frequency oscillator having an output signal which is mutually determined by said distance measuring means output and said wayside receiver output.

13. A train speed control system for use in territory characterized by the presence of a series of track sections, the rails of the track separated by insulated joints,
   (a) each of said track sections having electrically connected to said rails at the entrance end of said section a wayside receiver and electrically connected to said rails of said section at the exit end of said section a wayside train speed command transmitter and a train distance measuring means,
   (b) each of the trains operating in the system has a train speed command receiver and a train speed responsive transmitter,
       said train speed responsive transmitter having an output which is inductively impressed in said rails of said track section at the rear of said train to thereby effect a control of following trains, said train speed responsive transmitter output signal is always indicative of a more restrictive train speed command than a train speed command received by said train speed command receiver from said wayside transmitter when said train is alone in a track section, (c) said train distance measuring means having an output which is a function of the distance between a train entering a section and said exit end of said section entered, (d) said wayside receivers at said entrance ends of said sections having an output indicative of said output signal received from said train speed responsive transmitter when a train is occupying a track section and said wayside receivers having another output indicative of the train speed command delivered from said wayside transmitter at said exit end of said section when said section is unoccupied, (e) said wayside transmitter jointly controlled by said output from said wayside receiver and said output from said distance measuring means, whereby a train occupying any one section has its speed controlled by the wayside transmitter first approached, which speed control is a function of the distance to the exit end of said section occupied and the speed of a train occupying the next succeeding section, unless a preceding train is occupying the section entered whereupon the speed of the following train is controlled solely by the signal output from said train speed responsive transmitter of said train occupying said section entered.

14. The train speed control system of claim 13 wherein said wayside command speed transmitter includes a variable frequency oscillator having an output signal which is mutually determined by said distance measuring means output and said wayside receiver output.

References Cited
UNITED STATES PATENTS

| | | | |
|---|---|---|---|
| 3,038,066 | 6/1962 | Barry | 246—182 XR |
| 3,041,448 | 6/1962 | Pascoe et al. | 246—187 XR |
| 3,305,682 | 2/1967 | Bolster et al. | 246—167 |

ARTHUR L. LA POINT, *Primary Examiner.*

STANLEY T. KRAWCZEWICZ, *Assistant Examiner.*